# United States Patent [19]

Milson et al.

[11] Patent Number: 6,115,062
[45] Date of Patent: Sep. 5, 2000

[54] TELECINE REFERENCE ELEMENT, SYSTEM, AND METHOD FOR PROVIDING SCENE EXPOSURE INFORMATION

[75] Inventors: Peter G. Milson, Flamstead, United Kingdom; Christian Lurin, Saint Marcel, France; Mitchell J. Bogdanowicz, Spencerport, N.Y.; John D. Croft, Hemel Hempstead, United Kingdom

[73] Assignee: Eastman Kodak Company, Rochester, N.Y.

[21] Appl. No.: 08/817,868

[22] PCT Filed: Sep. 6, 1996

[86] PCT No.: PCT/US96/14364

§ 371 Date: May 6, 1997

§ 102(e) Date: May 6, 1997

[87] PCT Pub. No.: WO97/09821

PCT Pub. Date: Mar. 13, 1997

[30] Foreign Application Priority Data

Sep. 6, 1995 [GB] United Kingdom ............... 95018215

[51] Int. Cl.⁷ ........................................... H04N 9/47
[52] U.S. Cl. ........................... 348/96; 358/101; 358/527; 358/139; 358/93; 358/185; 358/54; 395/156; 395/161
[58] Field of Search ................... 348/96, 97; 358/106, 358/527

[56] References Cited

U.S. PATENT DOCUMENTS

| 4,991,007 | 2/1991 | Corley ................................ 358/106 |
| 5,255,083 | 10/1993 | Capitant et al. ................... 358/527 |
| 5,387,929 | 2/1995 | Collier ............................... 348/97 |
| 5,412,773 | 5/1995 | Carlucci et al. ................... 348/97 |

FOREIGN PATENT DOCUMENTS

| 2632715 | 1/1978 | Germany. |
| 91/04635 | 4/1991 | WIPO. |
| 98/07281 | 8/1997 | WIPO. |

OTHER PUBLICATIONS

SMPTE Journal, vol. 103, No. 3, Mar. 1994, White Plains (US), pp. 174–181, Glenn Kennel, "Digital Film Scanning and Recording: The Technology and Practice".

(List continued on next page.)

*Primary Examiner*—Chris S. Kelley
*Assistant Examiner*—Shawn S. An
*Attorney, Agent, or Firm*—Andrew J. Anderson

[57] ABSTRACT

A method of transferring a scene recorded on photographic negative film to video using a telecine is disclosed comprising the steps of:

a) setting up the telecine so that predetermined waveform readings are obtained for a reference element comprising at least one gray scale portion comprising density patches corresponding to three known density values;

b) storing the telecine set-up settings;

c) loading a scene on photographic negative film into the telecine wherein the scene includes a gray card;

d) using the stored telecine settings to effect transfer of the scene to video;

e) determining red, green and blue video voltages for the gray card; and f) converting the red, green and blue video voltages to Transfer Points between 0 and 50 to provide exposure information for the scene.

The reference element preferably comprises density patches which correspond to densities obtained in a color negative film after correctly exposing the film to a target comprising a 3% reflectance black, an 18% reflectance gray and a 90% reflectance white region, and standard photographic processing. Advantageously, the gray scale portion fills a full frame on the element. In a preferred embodiment of the reference element, the gray scale portion is horizontally arranged thereon. The red, green and blue video voltages are converted to Transfer Points between 0 and 50 to provide exposure information analogously to Printer Light values obtained for dailies or test print films.

19 Claims, 1 Drawing Sheet

OTHER PUBLICATIONS

Image Technology (Journal of the BKSTS), vol. 71, No. 8, Aug. 1989, London (GB), pp. 379–381, Nigel Varian, "Computer Simulation of the Colour Film Printing Operation Improves the Quality of Colour Grading".

"Chart Attack" article from *Cuts* magazine (Feb. 95, pp. 15–16).

Gamma & Density Co. Thorough Control System(T.C.S.)™ User Manual.

TELECINE REFERENCE ELEMENT, SYSTEM, AND METHOD FOR PROVIDING SCENE EXPOSURE INFORMATION

FIELD OF THE INVENTION

The present invention relates to improvements relating to the use of telecines, and is more particularly concerned with the control of the telecine transfer of motion picture film to video.

BACKGROUND OF THE INVENTION

It is well known that film dailies or rushes are conventionally produced as a motion picture is shot. These dailies or rushes are processed and then viewed by the director, the producer, the film editor, etc. working on the production to determine whether the scenes shot are acceptable. Each person on the production team assesses the dailies for different elements relevant to their respective roles in the team.

"Printer Light" information is also provided which assists the cinematographer/director of photography to determine whether the scenes were shot with a satisfactory exposure. This Printer Light information is determined from the settings of a conventional motion picture film printer required to produce a print with laboratory aim densities. This information is obtained by passing white light from a scene through dichroic filters to split the light into its three components, red, green and blue. The three light components are then used to expose a test film strip from which the densities corresponding to the intensities of the red, green and blue components of the light can be measured and compared with standard densities which correspond to an "ideal" exposure. The densities produced by the red, green and blue light components on the test film strip give an indication of the exposure given to the original film as the scene was recorded. Printer Light information provides values between 0 and 50, the neutral values being 25, 25, 25 and correspond to the ideal exposure. Printer Light values greater than or less than the neutral values correspond to over- or under-exposed scenes respectively, with each Printer Light unit corresponding to 0.025 units in Log Exposure.

However, there is an increasing demand for motion picture negative film to be transferred to video, and the film is never printed as such, as most film programs made specifically for television, for example, episodic shows, movies of the week and commercials, are transferred to video tape prior to showing. Telecine machines enable this transfer to be achieved. Furthermore, in feature film production, video dailies are replacing the film dailies or rushes and non-linear editing techniques are replacing conventional film editing.

When transferring negative film to video tape, the colorist, operator of a telecine, needs to adjust the settings of the telecine, in particular, gamma (or contrast), lift (or detail in the black areas of the scene) and gain (or brightness), so that the transfer of the film is optimized. This may be time-consuming if the film has not been correctly exposed, the color balance is incorrect etc., and adjustments have to be made. Several film test targets have been developed which are designed to assist the set up and maintenance of telecine equipment, and thereby offer operators nominal starting points for a film to video transfer session. Such targets, such as Eastman Kodak Company's Telecine Analysis Film (TAF), typically include a color bar test pattern and a neutral gray scale.

PROBLEM TO BE SOLVED BY THE INVENTION

With video dailies replacing film dailies, directors of photography for a production need to be provided with information relating to the camera exposure directly from the telecine transfers in a similar way Printer Light information was previously obtained from film dailies. While scene exposures may be estimated from telecine transfers made on telecines set up with prior art film test targets, there is no previously available system which provides scene exposure information directly from a telecine transfer of a film negative in an accurate manner analogously to Printer Light information.

SUMMARY OF THE INVENTION

It is therefore an object of the present invention to provide a method of transferring a scene from negative film to video, and in particular to provide scene exposure information similar to Printer Light information based upon such transfer.

It is a further object of the present invention to provide a telecine reference element, which can be used with a telecine transfer system, to transfer any negative film to video and provide scene exposure information.

In accordance with one aspect of the present invention, there is provided a method of transferring a scene recorded on photographic negative film to video using a telecine, the method comprising the steps of:

a) setting up the telecine so that predetermined waveform readings are obtained for a reference element comprising at least one gray scale portion comprising density patches corresponding to three known density values;

b) storing the telecine set-up settings;

c) loading a scene on photographic negative film into the telecine wherein the scene includes a gray card;

d) using the stored telecine settings to effect transfer of the scene to video;

e) determining red, green and blue video voltages for the gray card; and f) converting the red, green and blue video voltages to Transfer Points between 0 and 50 to provide exposure information for the scene.

In preferred embodiments of the invention, the reference element comprises density patches which correspond to densities obtained in a color negative film after correctly exposing the film to a target comprising a black, a gray and a white region, and standard photographic processing. More preferably, the black region of the target is a 3% reflectance, the gray region is an 18% reflectance and the white region is a 90% reflectance. Advantageously, the gray scale portion fills a full frame on the element. In a preferred embodiment of the reference element, the gray scale portion is horizontally arranged thereon.

The red, green and blue video voltages are converted to Transfer Points between 0 and 50 to provide exposure information analogously to Printer Light values obtained for dailies or test print films.

In accordance with another embodiment of the present invention, there is provided a system for providing exposure information during the transfer of a scene, including a gray card, recorded on negative film to video using a telecine, the system comprising:

a reference element as described above, the element being used for setting up the telecine so that predetermined waveform readings are obtained for the gray scale portion of the element;

conversion means for determining red, green and blue video voltages for the gray card and for converting these voltages to Transfer Points between 0 and 50; and display means for displaying the Transfer Points for the scene.

Advantageous Effect of the Invention

In accordance with the present invention, a reporting system similar to Printer Light type information can be provided which facilitates communication between colorists and cinematographers/directors of photography. Moreover, an aid to correct exposure is provided so that it is possible to predict the outcome of light settings on a release print or on a video transfer. Furthermore, the telecine set-up procedure for transfer of a negative film to video tape is much simplified providing a reliable starting point for the transfer of substantially all negative film stocks.

BRIEF DESCRIPTION OF THE DRAWINGS

For a better understanding of the present invention, reference will now be made, by way of example only, to the accompanying drawings in which.

DETAILED DESCRIPTION OF THE INVENTION

It has been determined that the tone scale of processed color negative film may be defined by three sets of red, green and blue density values when transferring the film to video using a telecine. By defining the waveform monitor readings for the red, green and blue voltages which correspond to the three densities, each telecine machine can be aligned to a common standard for the transfer of color negative films, which enables the determination of scene exposure conditions directly from telecine transfers as described below.

The most important density value is that corresponding to the correct exposure of a standard 18% "gray card" which is commonly used by cinematographers/directors of photography in their lighting set-up. In accordance with a preferred embodiment of the invention, two other density values which correspond to 90% reflectance and 3% reflectance are used together with the 18% reflectance, to mirror the straight line portion of the film characteristic within the telecine. These values allow maximum advantage to be taken of the latitude available within film stocks for the determination of scene exposure conditions. It will be appreciated that specular reflections and deep blacks may lie outside the range of reflectances described above, but these can be explored by a colorist or operator of the telecine using the full range available in the telecine machine.

Figure 1:
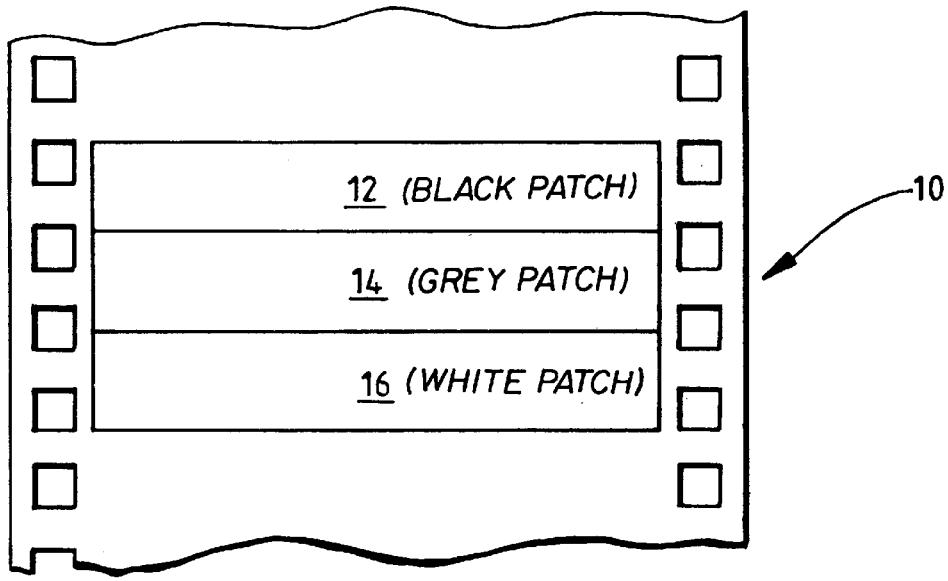
FIG. 1 illustrates a reference element in accordance with the present invention.
Figure 2:
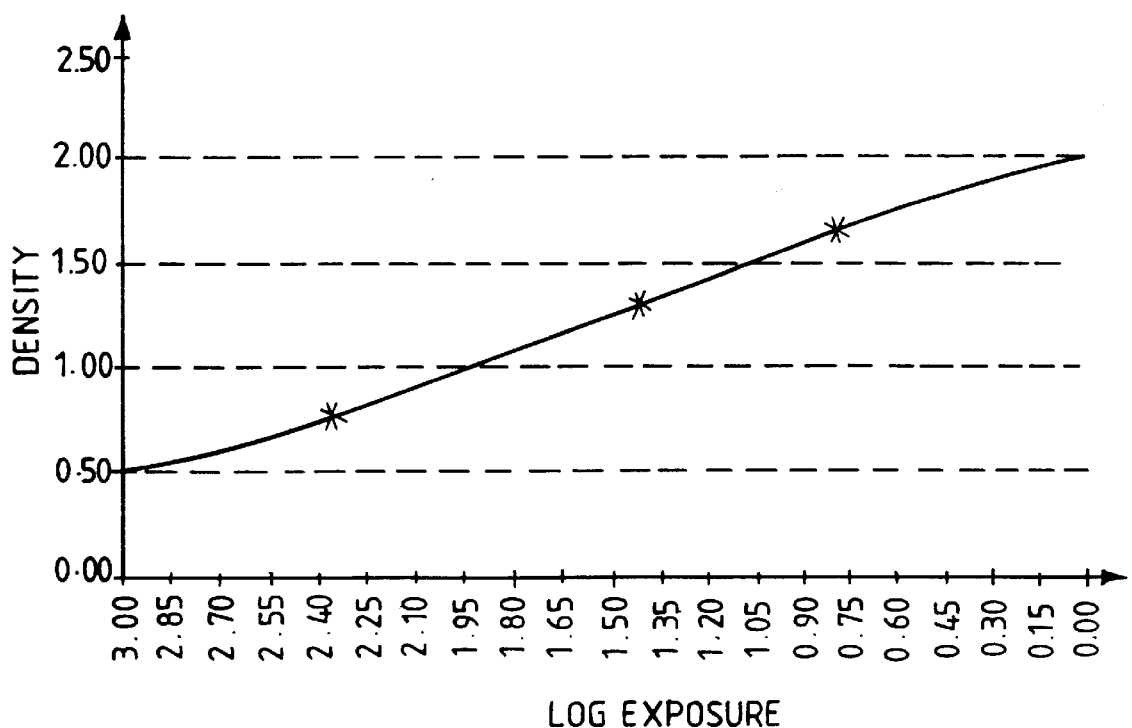
FIG. 2 shows a green sensitometric curve showing the three points which are incorporated into the reference element of FIG. 1.

In accordance with one embodiment of the present invention, FIG. 1 shows a reference element 10 which comprises a length of film strip having three patches 12, 14, 16 formed thereon of known densities. The element 10 is preferably a motion picture negative photographic film strip (e.g., 35 mm or 16 mm), such as Eastman EXR 200T negative film (Eastman Kodak Company), which has been exposed and processed to provide patches with specific known density values. Patches 12, 14, 16 are preferably arranged on the element 10 so that they fill a complete frame, that is, for 35 mm film the patches together have overall dimensions of approximately 22 mm by 16 mm, each patch having a width of approximately 5 mm. Each patch 12, 14, 16 in accordance with a preferred embodiment as described above comprises a horizontal gray scale formed by correctly exposing a target having patches of a 3% reflectance, an 18% reflectance and a 90% reflectance respectively with a negative working photographic film, and standard photographic processing (such as Kodak ECN-2 processing as described in the Kodak H-24 Manual, *Manual for Processing Eastman Motion Picture Films*) to form patches having predetermined, known density values. As mentioned above, the gray scale values are chosen to mirror the straight line portion of the green sensitometric curve which is characteristic of normally exposed Eastman EXR film stocks as shown in FIG. 2. While it is preferred to use a correctly exposed and processed negative working photographic film as the reference element, the reference element may also be formed directly, e.g., by printing dyed or pigmented patches on a support with known densities corresponding to those which are obtained by correct exposure and processing of a negative film.

The Status M densities for each of the patches 12, 14, 16 in relation to red, green and blue for a reference element in accordance with a preferred embodiment formed from Eastman EXR 200T negative film are shown in Table 1.

TABLE 1

| PATCH | DENSITIES | | |
| --- | --- | --- | --- |
|  | RED | GREEN | BLUE |
| WHITE | 1.17 | 1.69 | 2.08 |
| GRAY | 0.83 | 1.28 | 1.64 |
| BLACK | 0.41 | 0.74 | 1.05 |

Although Table 1 gives a set of preferred values for red, green and blue densities for each patch, it will be readily appreciated that other density values may be utilized in accordance with the reflectances chosen for a particular target from which the element is made.

Similar reference elements (not shown) can also be produced for Super 1 6 mm motion picture negative film stocks.

Each reference element 10 may be produced by shooting the gray scales thereon using a set of correct exposure parameters, such as those given in Table 2 for 200 speed film, and standard ECN-2 motion picture film photographic processing. Examples are given for 35 mm and 16 mm film stock.

Table 2.

TABLE 2

|  | 35 mm film stock | S16 mm film stock |
| --- | --- | --- |
| Camera | Aaton 35/1 | Aaton XTR |
| Lens | Zeiss 135 mm | Zeiss 135 mm |
| Lens aperture | T4 | T4 |
| Lights | 2 × 2 K Quartz 8.7 eV on gray | 2 × 2 K Quartz 8.7 eV on gray |
| Target distance | 2.1 m | 2.8 m |

Naturally, although the reference element 10 of FIG. 1 only shows one gray scale arrangement having patches 12, 14, and 16 in accordance with a preferred embodiment, it will be readily appreciated that any number of such arrangements can be provided on the element 10 for ease of access by the telecine operator.

In order to set up a telecine in accordance with the reference element 10, it is loaded into the telecine in the normal way. Using only the primary controls of lift (detail in black areas), gain (brightness) and gamma (contrast), and the primary color correction system, the controls are adjusted to achieve predetermined waveform monitor readings so that the three patches 12, 14, 16 give equal red, green and blue values at the waveform monitor. Minor color correction adjustments may also be necessary to fine-tune the setting. The settings are then stored in the telecine for recall at any time. The element 10 can then be removed from the telecine and stored in a suitable way to prevent it from fading.

The reference element of the present invention is used to calibrate telecines in a similar manner to that in which reference density patches are used to calibrate densitometers. Predetermined waveform monitor values (reference video voltages) are assigned for the red, green, and blue video signals obtained from the gray scale density patches corresponding to three known density values. The preferred red, green and blue reference video voltages associated with the preferred three density patches 12, 14, and 16 corresponding to 3% Black, 18% Gray, and 90% White reflectances are given in Table 3.

TABLE 3

| PATCH | VOLTAGE, V |
|---|---|
| BLACK | 0.03 |
| GRAY | 0.25 |
| WHITE | 0.50 |

In this way, two telecines can be set up using the element 10 and transfer identical densities into identical red, green and blue video signals.

Experiments to verify this were carried out using four different telecine machines made by Rank Cintel Limited, each machine being located in a different country, that is, in Belgium, France, United Kingdom and the United States of America. These machines were designated as W, X, Y and Z in accordance with Table 4.

TABLE 4

| DESIGNATION | TELECINE MACHINE | COUNTRY |
|---|---|---|
| W | Ursa | Belgium |
| X | Mark IIIC | France |
| Y | Ursa Gold | United Kingdom |
| Z | Ursa Gold | USA |

Each telecine machine was set up using an element 10 of the present invention, and the red, green and blue video voltages were measured for a twenty-one step sensitometric strip of Eastman EXR negative film stocks as given below:

a) Eastman EXR 50D 5245 b) Eastman EXR 100T 5248 c) Eastman EXR 200T 5287 d) Eastman EXR 200T 5293 e) Eastman EXR 500T 5296 f) Eastman EXR 500T 5298

The red video voltages for the twenty-one steps of film stock e) measured on the four different telecine machines set up in accordance with the present invention are shown in Table 5.

TABLE 5

| STEP | RED DENSITY | W | X | Y | Z |
|---|---|---|---|---|---|
| 21 | 0.14 | 0.00 | 0.00 | 0.00 | 0.00 |
| 20 | 0.14 | 0.00 | 0.00 | 0.00 | 0.00 |
| 19 | 0.15 | 0.00 | 0.00 | 0.00 | 0.00 |
| 18 | 0.17 | 0.00 | 0.00 | 0.00 | 0.00 |
| 17 | 0.22 | 0.00 | 0.00 | 0.00 | 0.00 |
| 16 | 0.31 | 0.00 | 0.01 | 0.00 | 0.00 |
| 15 | 0.42 | 0.04 | 0.04 | 0.03 | 0.04 |
| 14 | 0.52 | 0.10 | 0.08 | 0.09 | 0.08 |
| 13 | 0.61 | 0.15 | 0.12 | 0.13 | 0.14 |
| 12 | 0.71 | 0.20 | 0.17 | 0.18 | 0.18 |
| 11 | 0.81 | 0.27 | 0.24 | 0.26 | 0.26 |
| 10 | 0.92 | 0.35 | 0.32 | 0.33 | 0.33 |
| 9 | 1.03 | 0.42 | 0.42 | 0.44 | 0.43 |
| 8 | 1.13 | 0.50 | 0.50 | 0.54 | 0.52 |
| 7 | 1.22 | 0.57 | 0.60 | 0.65 | 0.60 |
| 6 | 1.30 | 0.65 | 0.67 | — | 0.66 |
| 5 | 1.37 | — | — | — | — |
| 4 | 1.42 | — | — | — | — |
| 3 | 1.48 | — | — | — | — |
| 2 | 1.52 | — | — | — | — |
| 1 | 1.55 | — | — | — | — |

The red, green and blue video voltages of the sensitometric strips were measured, and a series of tables were prepared which established a relationship between video voltages and the sensitometric strip densities (one table being derived for each telecine and each negative film stock). The densities were then converted into Transfer Points by dividing by 0.025 and off-setting the obtained values to arbitrarily obtain twenty-five Transfer Points for the laboratory aim density values corresponding to normal exposure of an 18% gray card. This was carried out to make Transfer Points correspond to values for Printer Lights previously obtained when the negative film is actually printed.

For each of the film stocks mentioned above, a table was derived for each of the telecines. As the results for the Transfer Points were very close, a single table of averaged results was then obtained for each film stock.

It was additionally found that averaging the results for the different film stocks to provide a single final table yielded a small accuracy loss which was within acceptable limits, that is, within ±2 Transfer Points. The table of averaged Transfer Points determined this way is given in Table 6.

TABLE 6

| | | RED | GREEN | | BLUE | |
|---|---|---|---|---|---|---|
| Exposure (Stop) | Voltage (V) | Transfer Point | Voltage (V) | Transfer Point | Voltage (V) | Transfer Point |
| | 0.00 | 3 | 0.05 | 3 | 0.05 | 3 |
| −3 | 0.02 | 4 | 0.07 | 4 | 0.06 | 4 |
| | 0.03 | 5 | 0.08 | 5 | 0.07 | 5 |
| | 0.03 | 6 | 0.08 | 6 | 0.08 | 6 |
| | 0.04 | 7 | 0.09 | 7 | 0.09 | 7 |
| −2.5 | 0.05 | 8 | 0.10 | 8 | 0.10 | 8 |
| | 0.06 | 9 | 0.11 | 9 | 0.11 | 9 |
| | 0.07 | 10 | 0.12 | 10 | 0.12 | 10 |
| −2 | 0.08 | 11 | 0.13 | 11 | 0.13 | 11 |
| | 0.09 | 12 | 0.14 | 12 | 0.14 | 12 |
| | 0.11 | 13 | 0.15 | 13 | 0.15 | 13 |
| −1.5 | 0.12 | 14 | 0.17 | 14 | 0.16 | 14 |
| | 0.13 | 15 | 0.18 | 15 | 0.17 | 15 |
| | 0.15 | 16 | 0.19 | 16 | 0.18 | 16 |
| | 0.16 | 17 | 0.20 | 17 | 0.20 | 17 |
| −1 | 0.18 | 18 | 0.22 | 18 | 0.21 | 18 |
| | 0.19 | 19 | 0.23 | 19 | 0.22 | 19 |
| | 0.21 | 20 | 0.25 | 20 | 0.23 | 20 |

TABLE 6-continued

| Exposure (Stop) | RED Voltage (V) | RED Transfer Point | GREEN Voltage (V) | GREEN Transfer Point | BLUE Voltage (V) | BLUE Transfer Point |
|---|---|---|---|---|---|---|
| −0.5 | 0.22 | 21 | 0.26 | 21 | 0.25 | 21 |
|  | 0.24 | 22 | 0.27 | 22 | 0.26 | 22 |
|  | 0.26 | 23 | 0.29 | 23 | 0.27 | 23 |
|  | 0.28 | 24 | 0.31 | 24 | 0.29 | 24 |
| N | 0.29 | 25 | 0.32 | 25 | 0.30 | 25 |
|  | 0.31 | 26 | 0.34 | 26 | 0.32 | 26 |
|  | 0.33 | 27 | 0.35 | 27 | 0.33 | 27 |
| +0.5 | 0.35 | 28 | 0.37 | 28 | 0.35 | 28 |
|  | 0.37 | 29 | 0.39 | 29 | 0.36 | 29 |
|  | 0.39 | 30 | 0.41 | 30 | 0.38 | 30 |
|  | 0.41 | 31 | 0.42 | 31 | 0.40 | 31 |
| +1 | 0.43 | 32 | 0.44 | 32 | 0.42 | 32 |
|  | 0.45 | 33 | 0.46 | 33 | 0.44 | 33 |
|  | 0.47 | 34 | 0.48 | 34 | 0.45 | 34 |
| +1.5 | 0.50 | 35 | 0.50 | 35 | 0.47 | 35 |
|  | 0.52 | 36 | 0.52 | 36 | 0.49 | 36 |
|  | 0.54 | 37 | 0.54 | 37 | 0.51 | 37 |
| +2 | 0.57 | 38 | 0.57 | 38 | 0.53 | 38 |
|  | 0.59 | 39 | 0.59 | 39 | 0.56 | 39 |
|  | 0.62 | 40 | 0.61 | 40 | 0.58 | 40 |
| +2.5 | 0.65 | 41 | 0.64 | 41 | 0.60 | 41 |
|  | 0.67 | 42 | 0.66 | 42 | 0.62 | 42 |
|  | 0.70 | 43 | 0.68 | 43 | 0.65 | 43 |
|  | 0.71 | 44 | 0.71 | 44 | 0.67 | 44 |

As can be seen from Table 6, the Transfer Points do not linearly correspond with the red, green, and blue video voltages. Accordingly, accurate scene exposure information is not readily available solely from the voltages. The Exposure (Stop) values presented in Table 6 correspond to the steps of the twenty-one step sensitometric strips. In accordance with the invention, accurate scene exposure information is obtained by assigning Transfer Points to the voltages corresponding to the varying densities of the sensitometric strips in relation to the known exposure ranges for the strip steps. While Table 6 presents averaged Transfer Points obtained for a variety of films and telecines, conversion tables for individual films and/or individual telecines may also be used if desired to provide exposure information. It is an advantage of the invention that a single reference element may be used in combination with either an averaged conversion table to conveniently provide exposure information for most negative films, as well as with separate, independently derived conversion tables to provide precise exposure information for specific films.

For any two telecine machines which have been set up using a reference element in accordance with the present invention, the Transfer Points will be the same. This is in contrast to Printer Lights which tend to be laboratory specific.

Having determined a Transfer Points conversion table, it can be used to provide exposure information for a scene in two ways: i) directly if an 18% gray card has been shot at the beginning of a scene, or ii) to derive an "Exposure Level" table.

In case i) above, the 18% gray card must be included at the beginning of the scene. The negative film is loaded into the telecine and advanced to locate the gray card for the first scene. The gray card will normally be included at the head of each roll or at the head of each new lighting set-up or at any suitable predetermined intervals. The settings in accordance with the reference element 10 are recalled from memory, and without changing any controls, the red, green and blue video voltages corresponding to the 18% gray card in the scene are read off. These video voltages can than be converted directly using Table 6 as a look-up table (or a specialized look-up table for individual films and/or individual telecines) into Transfer Points and the information fed back to the cinematographer/director of photography. In this way, the cinematographer/director of photography can assess the exposure of the film in much the same way as with Printer Light information. The colorist can then transfer the negative film as required. For example, high contrast and bright images can be transferred for ease of editing.

In accordance with a further embodiment of the invention, a system can be provided which automatically determines the Transfer Points from the waveform monitor as described above when a gray card is included in the scene. In accordance with one such embodiment, a look-up table or tables derived as described above function as conversion means, which may be used in combination with conventional display means (such as an LED display) to directly convert the video voltages into Transfer Points and display such Transfer Points values to the telecine operator.

If a gray card is not used at the beginning of the scene, case ii), because it has been forgotten or placed in the scene where a satisfactory reading cannot be obtained, Table 7, derived from Table 6, can be used to enable the colorist to provide exposure level information for the cinematographer/director of photography.

TABLE 7

| Exposure (Stop) | Green Video Voltage (V) |
|---|---|
|  | 0.45 |
| −1.5 |  |
|  | 0.40 |
| −1 |  |
|  | 0.35 |
| −0.5 |  |
|  | 0.30 |
| N |  |
|  | 0.25 |
| +0.5 |  |
|  | 0.20 |
| +1 |  |
|  | 0.15 |
| +1.5 |  |
|  | 0.10 |

In order to use Table 7, the colorist must first color grade the scene by eye using stored settings from the element 10 as a starting point (as previously described). The settings are recorded. The negative film is then unloaded from the telecine and the reference element of the present invention loaded into the telecine. The settings applied to the scene are then applied to the reference element, and the green video voltage of the 18% gray patch is measured. Table 7 is then used to determine the exposure level.

It will be appreciated that the method using Table 7, case ii), is not as accurate as the method using Table 6, case i), as there is a limited exposure level from −1.5 to +1.5. This limitation is the result of the higher subjectivity involved, that is, the settings being obtained according to what a particular colorist likes. This means that images which have been too heavily over- or under-exposed will be corrected in different ways by different colorists.

It is also possible to include a reference element in accordance with the present invention on the leader attached to the negative film This has the advantage that there is no need to reload the element when deriving the Printer Light information when no gray card is present in the scene.

An additional benefit of the element of the present invention is that it can be used to provide a starting point for grading of a scene shot on negative film. This saves time and adds consistency to the results of a telecine transfer. The reference element of the present invention will enable a telecine machine to satisfactorily transfer the vast majority of Eastman EXR negative film stocks. A proper tone scale reproduction is ensured and the outstandingly good color to neutral balance of these film stocks means that even color correction is quite small.

A further benefit of the reference element in accordance with the present invention is that three horizontal density patches can be used to check for telecine shading problems. However, it will be appreciated that the density patches may also be vertically arranged on the photographic element.

The invention has been described in detail with particular reference to preferred embodiments thereof, but it will be understood that variations and modifications can be effected within the spirit and scope of the invention.

What is claimed is:

1. A method of transferring a scene recorded on photographic negative film to video using a telecine, the method comprising the steps of:
   a) setting up the telecine so that predetermined waveform readings are obtained for a reference film element comprising at least one gray scale portion comprising density patches corresponding to three known density values;
   b) storing the telecine set-up settings;
   c) loading a scene on photographic negative film into the telecine wherein the scene includes a gray card;
   d) using the stored telecine settings to effect transfer of the scene to video;
   e) determining red, green and blue video voltages for the gray card; and
   f) converting the red, green and blue video voltages to Transfer Points between 0 and 50 to provide exposure information for the scene by referring to a look-up table derived from measuring the red, green, and blue video voltages for step sensitometric strips of negative film stock on a telecine set-up in accordance with step a), correlating the measured voltages to the sensitometric strip densities, and converting the sensitometric strip densities into Transfer Points by dividing by 0.025 and off-setting the obtained values to obtain twenty-five Transfer Points for the laboratory aim density values corresponding to normal exposure of an 18% gray card.

2. A method according to claim 1, wherein the density patches of the reference element correspond to densities obtained in a color negative photographic film after correctly exposing the film to a target comprising a black, a gray and a white region, and standard color negative film processing.

3. A method according to claim 2, wherein the black region of the target is a 3% reflectance region, the gray region is an 18% reflectance region and the white region is a 90% reflectance region.

4. A method according to claim 3, wherein the predetermined waveform readings obtained for the reference element are 0.03 volts for each of the red, green, and blue video signals corresponding to the 3% black reflectance region, 0.25 volts for each of the red, green and blue video signals corresponding to the 18% gray reflectance region, and 0.50 volts for each of the red, green, and blue video signals corresponding to the 90% white reflectance region.

5. A method according to claim 4, wherein the red, green and blue video voltages are converted to Transfer Points between 0 and 50 by referring to a look-tip table derived from measuring the red, green, and blue video voltages for step sensitometric strips of negative film stock on a telecine set-up in accordance with step a), correlating the measured voltages to the sensitometric strip densities, and converting the sensitometric strip densities into Transfer Points by dividing by 0.025 and off-setting the obtained values to obtain twenty-five Transfer Points for the laboratory aim density values corresponding to normal exposure of an 18% gray card.

6. A method according to claim 3, wherein the gray scale portion fills a full frame on the element.

7. A method according to claim 6, wherein the gray scale portion is horizontally arranged on the element.

8. A method according to claim 2, wherein the element comprises an exposed and processed color negative photographic film.

9. A method according to claim 3, wherein the white density patch of the element has a red density value of about 1.17, a green density value of about 1.69, and a blue density value of about 2.08, the gray density patch of the element has a red density value of about 0.83, a green density value of about 1.28, and a blue density value of about 1.64, and the black density patch of the element has a red density value of about 0.41, a green density value of about 0.74, and a blue density value of about 1.05.

10. A method according to claim 9, wherein the gray scale portion fills a full frame on the element.

11. A reference film element for use with a telecine transfer device, said element comprising a gray scale portion, wherein the gray scale portion consists essentially of three density patches which correspond to densities obtained in a color negative photographic film after correctly exposing the film to a target comprising a 3% reflectance black region, an 18% reflectance gray region and a 90% reflectance white region, and standard color negative film processing.

12. An element according to claim 11, wherein the gray scale portion fills a full frame on the film.

13. An element according to claim 12, wherein the gray scale portion is horizontally arranged on the element.

14. An element according to claim 11, which comprises an exposed and processed color negative photographic film.

15. An element according to claim 11, wherein the white density patch of the element has a red density value of about 1.17, a green density value of about 1.69, and a blue density value of about 2.08, the gray density patch of the element has a red density value of about 0.83, a green density value of about 1.28, and a blue density value of about 1.64, and the black density patch of the element has a red density value of about 0.41, a green density value of about 0.74, and a blue density value of about 1.05.

16. An element according to claim 15, wherein the gray scale portion fills a full frame on the element.

17. An element method according to claim 16, wherein the gray scale portion is horizontally arranged on the element.

18. A system for providing exposure information during the transfer of a scene which includes a gray card recorded on negative film to video using a telecine, the system comprising:
   a reference film element comprising at least one gray scale portion comprising density patches corresponding to three known density values, the element being used for setting up the telecine so that predetermined waveform readings are obtained for the gray scale portion of the photographic element;
   conversion means for determining red, green and blue video voltages for the gray card and for converting these voltages to Transfer Points between 0 and 50, comprising a look-up table derived from measuring the red, green and blue video voltages for step sensitometric strips of negative film stock on a telecine set-up with the reference element, correlating the measured voltages to the sensitometric strip densities, and converting the sensitometric strip densities into Transfer Points by dividing by 0.025 and off-setting the obtained values to obtain twenty-five Transfer Points for the laboratory aim density values corresponding to normal exposure of an 18% gray card; and display means for displaying the Transfer Points for the scene.

19. A system according to claim 18, wherein: the density patches of the reference element correspond to densities obtained in a color negative photographic film after correctly exposing the film to a target comprising a 3% reflectance black, an 18% reflectance gray and a 90% reflectance white region, and standard color negative film processing.

* * * * *